(12) United States Patent
Gentner

(10) Patent No.: US 10,058,796 B2
(45) Date of Patent: Aug. 28, 2018

(54) EVAPORATOR AND PROCESS FOR USE THEREOF

(71) Applicant: Sulzer Chemtech AG, Winterthur (CH)

(72) Inventor: Michel Gentner, Leymen (FR)

(73) Assignee: Sulzer Chemtech AG, Winterthur (CH)

( * ) Notice: Subject to any disclaimer, the term of this patent is extended or adjusted under 35 U.S.C. 154(b) by 480 days.

(21) Appl. No.: 14/650,359

(22) PCT Filed: Oct. 9, 2013

(86) PCT No.: PCT/EP2013/071063
§ 371 (c)(1),
(2) Date: Jun. 8, 2015

(87) PCT Pub. No.: WO2014/090431
PCT Pub. Date: Jun. 19, 2014

(65) Prior Publication Data
US 2015/0314215 A1    Nov. 5, 2015

(30) Foreign Application Priority Data

Dec. 10, 2012  (EP) .................................... 12196291

(51) Int. Cl.
*B01D 1/06* (2006.01)
*B01D 1/30* (2006.01)
(Continued)

(52) U.S. Cl.
CPC ............. *B01D 5/009* (2013.01); *B01D 1/065* (2013.01); *B01D 1/305* (2013.01); *B01D 3/10* (2013.01);
(Continued)

(58) Field of Classification Search
CPC .......... B01D 1/06; B01D 1/065; B01D 1/305; B01D 5/006; B01D 5/0063; B01D 5/0075; B01D 5/009
See application file for complete search history.

(56) References Cited

U.S. PATENT DOCUMENTS 2,415,411 A   2/1947  Bowman
2,609,334 A   9/1952  Pyle et al.
(Continued)

FOREIGN PATENT DOCUMENTS

FR           53 486       1/1946

*Primary Examiner* — Renee E Robinson
(74) *Attorney, Agent, or Firm* — Larson & Anderson, LLC

(57) ABSTRACT

An evaporator (1) adapted for a counter-current flow of at least one liquid and one vapor therein is disclosed. The evaporator (1) comprises an evaporator sub-unit (70), an internal sub-unit (90) having a surface (92), a heat exchanger sub-unit (100), and a condenser sub-unit (110), all in communication with one another and contained within one common vessel (12), wherein the internal sub-unit (90) is located above the evaporator sub-unit (70), the heat exchanger sub-unit (100) is located above the evaporator sub-unit (70), and the condenser sub-unit (110) is located above the heat exchanger sub-unit (100) and the internal sub-unit (90). The present invention further relates to a process to separate components using the evaporator (1) and also to the use of the evaporator (1) or the process in the purification and/or concentration of a thermally-sensitive compound and/or in the removal of a solvent.

20 Claims, 5 Drawing Sheets

(51) Int. Cl.
*B01D 5/00* (2006.01)
*B01D 3/28* (2006.01)
*B01D 3/10* (2006.01)
*B01D 3/14* (2006.01)

(52) U.S. Cl.
CPC ............. *B01D 3/14* (2013.01); *B01D 3/28* (2013.01); *B01D 5/006* (2013.01); *B01D 5/0075* (2013.01)

(56) References Cited

U.S. PATENT DOCUMENTS

| | | |
|---|---|---|
| 5,171,407 A | 12/1992 | Meili |
| 5,248,394 A * | 9/1993 | Schlesinger ........... B01D 1/305 202/205 |
| 2011/0048920 A1 | 3/2011 | Avery et al. |
| 2011/0132550 A1 | 6/2011 | Avery et al. |

* cited by examiner

EVAPORATOR AND PROCESS FOR USE THEREOF

BACKGROUND OF THE INVENTION

The present invention relates to an evaporator adapted for a counter-current flow of at least one liquid and vapor therein. The present invention also relates to a process for using said evaporator to separate at least two components and the use of said evaporator in the purification and/or concentration of a thermally-sensitive compound and/or in the removal of a solvent.

An evaporator is a device that transforms a liquid material into a vapor form, and evaporators may be used to separate compounds based on their relative boiling points and volatility. Evaporation processes are of utility, for example, in the work-up after a chemical reaction to isolate, concentrate and/or purify the product(s) in a variety of industrial processes. Evaporation is thus widely used to concentrate foods and chemicals as well as to recover solvents. The purified or concentrated substances may be inorganic in nature such as metallic compounds, organic such as fine chemicals or natural products, or organometallic compounds. The removed substances may be water, solvents and/or reaction byproducts or other impurities.

In a typical evaporation system, a liquid containing the desired product is fed into an evaporator and is heated by a heat source. The applied heat converts a volatile component in the liquid into vapor. The vapor is removed from the rest of the liquid in a separator and then condensed by a condenser. The thus concentrated liquid product may be either fed into a second evaporator unit, recirculated or removed. The evaporator may be operated at reduced pressure of typically about 2 to 10 mbar absolute so as to favorably reduce the boiling points of the components, thus allowing temperature-sensitive products to be purified and/or concentrated at lower temperatures.

Various types of evaporators are known, such as the falling film, flash, rising film (long tube vertical), climbing and falling plate, wiped film, and multiple effect evaporators. For example, US 2004/0182692 A1 discloses a falling film evaporator. Typical of such evaporation systems is the use of a series of equipment that provide standard units of operation, for example, an evaporator unit followed by a condenser unit, optionally with an intervening separator unit. These separate units are contained in pressure vessels with their own individual shells and connected together by piping. The use of longer piping having smaller diameters and with more bends generates more pressure drop and thus limits the vacuum level that may be achieved in the evaporator. For example, a typical vapor line between an evaporator and condenser may cause a pressure drop of about 1 mbar, which is then on the same order of magnitude as the operating pressure of the evaporator itself. Such typical pressure drops may undesirably increase the pressure in the evaporation section by about 10% to a factor of about 3. Furthermore the use of such separate units makes the system more costly and complex to design and operate, as well as causing it to have a large room requirement ("footprint").

More elaborate evaporator systems are improved by using a mist eliminator unit between the evaporator unit and the condenser unit or by using a feed preheater unit upstream of the evaporator unit for heat recovery. The feed preheater unit is in general heated with the liquid that is leaving at the bottom of the evaporation unit. However, in cases where most of the feed is evaporated, the largest fraction is the vapor fraction. Feed preheating by means of the vapor fraction is more challenging as a partial condenser is required. This partial condenser creates even more pressure drop for the vapor that flows in total through the evaporator, demister, feed preheater and condenser. Therefore attempting to improve the evaporator by the addition of these additional units limit the vacuum that may be achieved and thus higher operating temperatures are required which unnecessarily damages thermally-sensitive compounds.

It is noted that wiped film evaporators may be used for treating thermally-sensitive compounds; however, such evaporators still require the use of several shells and they also rely on moving parts, which requires both increased maintenance and investment costs.

In conclusion, it would be desirable to have an evaporator capable of operating at lower pressures and thus also temperatures and that would thus be better suited for purification of thermally-sensitive compounds, especially those having low viscosity (i.e. less than or equal to about 20 millipascal-second), than those of the prior art, and while also offering an integrated system not requiring piping between sub-units and separate pressure vessel shells for each sub-unit thus reducing the cost, complexity and footprint.

SUMMARY OF THE INVENTION

Starting from this state of the art, it is an object of the invention to provide a simplified evaporator that does not suffer from the previous mentioned deficiencies, particularly resulting in higher operating pressures and thus temperatures, and also that eliminates the requirement for piping between sub-units and several pressure vessel shells. Further objects of the invention include providing a process for using said evaporator and a use of said evaporator or process in the purification and/or concentration of a preferably thermally-sensitive compound, preferably one of low viscosity, and/or in the removal of a solvent, or in the separation of a compound having a boiling point under atmospheric pressure at a temperature above its thermal decomposition temperature.

According to the invention, these objects are achieved by an evaporator adapted for a counter-current flow of at least one liquid and one vapor therein, comprising: a first inlet for a first liquid feed stream, a first outlet for a first liquid output stream, a second outlet for a first vapor stream, an evaporator sub-unit comprising an evaporating means for evaporation of a liquid to produce a vapor, an internal sub-unit having a surface embodied such that a contact is provided between a vapor and a liquid and a mass transfer is provided between the vapor and the liquid, a heat exchanger sub-unit comprising a heat exchanging means embodied such that a heat exchange is provided between a liquid stream, preferably the feed stream or a cooling or heating stream, and a liquid or vapor contained within the evaporator, and a condenser sub-unit comprising a condensing means for condensing the vapor to a condensate, wherein the first inlet, the first outlet, second outlet, the evaporator sub-unit, the internal sub-unit, the heat exchanger sub-unit, and the condenser sub-unit are all in fluid and/or vapor communication with one another and are contained within one common vessel, and wherein the internal sub-unit is located substantially above the evaporator sub-unit, the heat exchanger sub-unit is located substantially above the evaporator sub-unit, preferably substantially above the internal sub-unit, and the condenser sub-unit is located substantially above the heat exchanger sub-unit and the internal sub-unit, and wherein the first inlet is located in a lower portion of the vessel, preferably substantially above the evaporator sub-unit, the first outlet is located substantially below the evaporator sub-unit, and the second outlet is located substantially above the evaporator sub-unit and the first inlet.

According to the invention, these further objects are achieved firstly by a process to separate at least two components, wherein to a said evaporator, a first liquid feed stream comprising the at least two components is fed by means of the first inlet, the feed stream passes into the evaporator sub-unit, in which a vapor stream is formed from the feed stream by means of heat and mass transfer in an evaporating means, preferably in contact with the heated surfaces, wherein the vapor stream exits in a substantially upward direction from the sub-unit, and wherein the remaining non-vaporized feed stream exits in a substantially downward direction from the sub-unit and is subsequently removed as a first liquid output stream comprising a first component of the at least two components by means of the first outlet, the vapor stream, optionally containing a mist, passes into the internal subunit, in which the mist, if present, is removed from the vapor stream, and the mist is, optionally collected, withdrawn from the evaporator and/or returned by means of gravity to the evaporator sub-unit, the vapor stream passes into the heat exchanger sub-unit, in which a heat transfer occurs between the vapor stream and a liquid stream, preferably the feed stream or a cooling or heating stream, wherein, if the liquid stream is the feed stream, the heat transfer occurs prior to the feed stream passing into the vessel through the first inlet, wherein a first portion of the vapor stream is condensed within the condenser sub-unit in a condensing means to form a first condensed stream which is partially or fully withdrawn from the evaporator and/or returned by means of gravity to the evaporator sub-unit and a second non-condensed portion of the vapor stream is removed as a first vapor stream comprising a second component of the at least two components by means of the second outlet.

Said evaporator and said process is used in accordance with the invention in the purification and/or concentration of a thermally-sensitive compound, preferably one of low viscosity, and/or in the removal of a solvent, or in the separation of a high-boiling compound. As will be discussed, such compounds and processes particularly benefit from the present invention.

The present invention achieves these objects and provides a solution to this problem by means of a common vessel within which are contained the first inlet, the first outlet, second outlet, the evaporator sub-unit, the internal sub-unit, the heat exchanger sub-unit, and the condenser sub-unit, all of which are in fluid and/or vapor communication with one another. As a result, the sub-units no longer are contained in separate pressure vessels with their own individual shells and connected together by piping. In this manner, the cost and complexity of the evaporator according to the invention are reduced. Furthermore the elimination of the piping allows the pressure drops to be reduced and thus higher vacuum levels may be achieved in the evaporator sub-unit and lower operating temperatures may be used. This beneficial reduction in the required operating temperature then also contributes to a reduction in the degradation of thermally-sensitive compounds, particularly those having low viscosities.

Further contributing to the achievement of these objects and provision of a solution to this problem by the present invention are the particular configuration and geometric arrangement of the inlets, outlets and sub-units within the one common vessel. The internal sub-unit [vessel internals such as distributing, contacting (mass transfer), defoaming, coalescing, or demisting internals] is located substantially above the evaporator sub-unit, the heat exchanger sub-unit is located substantially above the evaporator sub-unit, preferably substantially above the internal sub-unit, and the condenser sub-unit is located substantially above the heat exchanger sub-unit and the internal sub-unit, and wherein the first inlet is located in a lower portion of the vessel, preferably substantially above the evaporator sub-unit, the first outlet is located substantially below the evaporator sub-unit, and the second outlet is located substantially above the evaporator sub-unit and the first inlet. This particular arrangement allows for the necessary fluid and/or vapor communication between the inlets, outlets, and sub-units for operation of the evaporator to take place using gravity and convection to provide the required flows without the need for moving parts such as pumps. Furthermore the specified location of the heat-exchanger sub-unit allows for feed preheating against the vapor fraction, which is particularly beneficial in cases where most of the liquid feed stream to the evaporator sub-unit is evaporated.

These results are then surprisingly achieved without the need for any special elaborate apparatuses involving the combination of multiple separate preheater, evaporator, separator and condenser sub-units, each with their own separate pressure vessel shells, sets of vessel internals (such as distributing, contacting, defoaming, coalescing, or demisting internals), sets of feed pumps and sets of process and level controllers and with extensive piping between sub-units.

In a preferred embodiment of the evaporator or process, the evaporator sub-unit is a falling film evaporator sub-unit comprising one or more heated surfaces, wherein the surfaces are preferably those of tubes, channels, or plates. The use of a falling film evaporator is advantageous because it is a static device and does not need complex rotating parts like wiped film evaporators do. In a more specific preferred embodiment, the one or more heated surfaces are substantially vertical, which improves heat transfer and allows them to be gravity driven and thus eliminates the need for a pump.

According to another preferred embodiment of the evaporator or the process, the heat exchanger sub-unit is a feed preheater sub-unit for preheating the feed stream and the internal sub-unit is a mist eliminator sub-unit for eliminating a mist. A feed preheater may be beneficially used to provide heat integration and thus reduce energy consumption. The process of evaporation creates mists by the entrainment of liquid droplets into the gas stream. Entrainment causes carry-over of less volatile components and reduces the efficiency of the separation process. Therefore the use of a mist eliminator sub-unit will be beneficial in improving the separation.

According to yet another preferred embodiment of the evaporator and the process, the evaporator additionally comprises a first collector, preferably having a jacket for providing thermal isolation, located in an upper portion of the vessel and substantially below the heat exchanger sub-unit, and substantially above the evaporator sub-unit, and embodied such that a condensate is collected and the collected condensate is partially or fully withdrawn from or refluxed within the common vessel. The use of a collector is beneficial in that the condensate can be selectively removed from the vessel. Otherwise it would simply return to the evaporator sub-unit and be re-evaporated causing unnecessary cycling, energy consumption, and thermal treatment. These same benefits may be obtained in an alternative preferred embodiment in which the evaporator additionally comprises a second collector for collecting a liquid, preferably from the condenser sub-unit, or from one or more static sections.

In further or more specific preferred embodiments, the evaporator comprises a distributor for distributing a liquid, preferably distributing to the evaporator sub-unit or to the static section. Distributors will optimize the distribution of liquids in the evaporator and thus increase the efficiency of the evaporator and the separation process.

According to a further other preferred embodiment of the evaporator and the process, the evaporator additionally comprises a boot, wherein the boot is contained within the common vessel and is located in the lower portion and substantially below the evaporator sub-unit. The provision of a boot is beneficial in that it minimizes liquid hold-up in the evaporator vessel and thus reduces the residence time at elevated temperatures of the materials to be separated.

According to yet a further other preferred embodiment of the evaporator and the process, the evaporator uses a means other than piping for leading the liquid and the vapor between any of the sub-units. The lack of piping beneficially reduces the pressure losses, cost, footprint and risk of leakages.

According to still yet a further preferred embodiment of the evaporator and the process, moving parts are absent within the common vessel, which then beneficially reduces maintenance, operational complexity, energy consumption, as well as their associated costs.

In yet another preferred embodiment of evaporator and the process, the evaporator additionally comprises one or more static sections, wherein the one or more sections are located substantially above the evaporator sub-unit and substantially below the condenser sub-unit, and wherein the sections each comprise a packing and/or trays. In the present application the term "static section" refers to an internal section having no moving parts. The use of static sections provides more surface area for mass transfer, thus making the separation more efficient.

In a preferred embodiment of the process, the feed stream and the first liquid output stream comprise a compound having a thermal degradation temperature of from 10 to 300, preferably from 20 to 275, most preferably 30 to 250° C., and preferably one having a viscosity at the operating temperature of less than or equal to 20, preferably 10, most preferably 2 millipascal-second. Compounds having such sensitivity to thermal degradation can particularly benefit from the low operating temperatures achievable with the evaporator and the process of the invention. The invention is particularly beneficial for such compounds also having low viscosity because they do not then require significant energy input in order to improve their flow properties. This may be important, for example, when a falling film evaporator sub-unit is used which has one or more substantially vertical heated surfaces. It is noted that rotating film evaporator systems are the state of the art for evaporation at low pressure (less than 2 mbar); however, such evaporators require the use of moving parts, which is undesirable.

In another preferred embodiment of the process, the feed stream and the first vapor stream comprise a solvent. The evaporator and the process of the invention have been found to be particularly well-suited to separation processes involving the removal of solvents. The presence of solvents in the feed advantageously contributes to reducing viscosity and liquid flow, which is of benefit, particularly in gravity-driven processes. Furthermore many thermally-sensitive compounds will be prepared, reacted and handled in dilute solution so that they readily flow and mix with other compounds etc. without requiring the application of excessive temperatures that may result in their thermal degradation.

In yet another preferred embodiment of the process, the pressure within the evaporator sub-unit is less than 10, preferably 5, more preferably 2, most preferably 1 mbar. The ability to achieve such low operating pressures makes possible the use of low operating temperatures, which is of importance in minimizing the thermal degradation of thermally-sensitive compounds. Furthermore the ability to use low operating temperatures is economically beneficial in terms of reducing the duty consumption and the operating costs of the evaporator and the process.

Further aspects of the present invention include the use of the evaporator of the invention or the process of the invention in the purification and/or concentration of a compound having a thermal degradation temperature of from 10 to 300, preferably from 20 to 275, most preferably 30 to 250° C., and preferably one having a viscosity at the operating temperature of less than or equal to 20, preferably 10, most preferably 2 millipascal-second, and/or in the removal of a solvent, or in the separation of a compound having a boiling point under atmospheric pressure at a temperature above its thermal decomposition temperature. Such uses with these compounds and processes particularly benefit from the previously discussed advantages of the evaporator and process of the invention. The latter compounds having boiling points above their thermal decomposition temperatures are particularly thermally sensitive and thus also particularly benefit from the low operating temperatures and pressures achievable in the invention.

The thermal decomposition temperature of a substance is the temperature at which the substance chemically decomposes. The thermal decomposition temperature of a substance may be determined by a variety of conventional thermoanalytical methods well known in the art such as differential scanning calorimetry (DSC) or thermogravimetric analysis (TGA), optionally connected to coupled in-line characterization equipment such as gas chromatography, mass spectrometry or FTIR spectrometers in the case of TGA. The viscosity may be determined by conventional methods well known in the art including capillary viscometers such as Ubelohde, Ostwald, and Cannon-Fenske viscometers or viscometers such as the cone/plate or falling ball viscometers.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more evaporator claims or the subject matter of a mixture of one or more process claims and evaporator claims. By analogy, the subject matter of any one evaporator claim may be combined with the subject matter of one or more other evaporator claims or the subject matter of one or more process claims or the subject matter of a mixture of one or more process claims and evaporator claims. By way of example, the subject matter of claim 1 may be combined with the subject matter of any one of claims 11 to 15. In one embodiment, the subject matter of claim 11 is combined with the subject matter of any one of claims 1 to 10. By way of another example, the subject matter of claim 1 may also be combined with the subject matter of any two of claims 11 to 15. In one specific embodiment, the subject matter of claim 1 is combined with the subject matter of claims 2 and 11. In another specific embodiment, the subject matter of claim 11 is combined with the subject matters of claims 1 and 5. By way of example, the subject matter of claim 1 may be combined with the subject matter of any three of claims 2 to 15. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned preferred evaporator embodiments may be combined with the subject matter of one or more of the other above-mentioned preferred process embodiments or vice versa without limitation.

BRIEF DESCRIPTION OF THE DRAWINGS

The invention will be explained in more detail hereinafter with reference to various embodiments of the invention as well as to the drawings. The schematic drawings show.

DETAILED DESCRIPTION OF THE INVENTION

Figure 1:
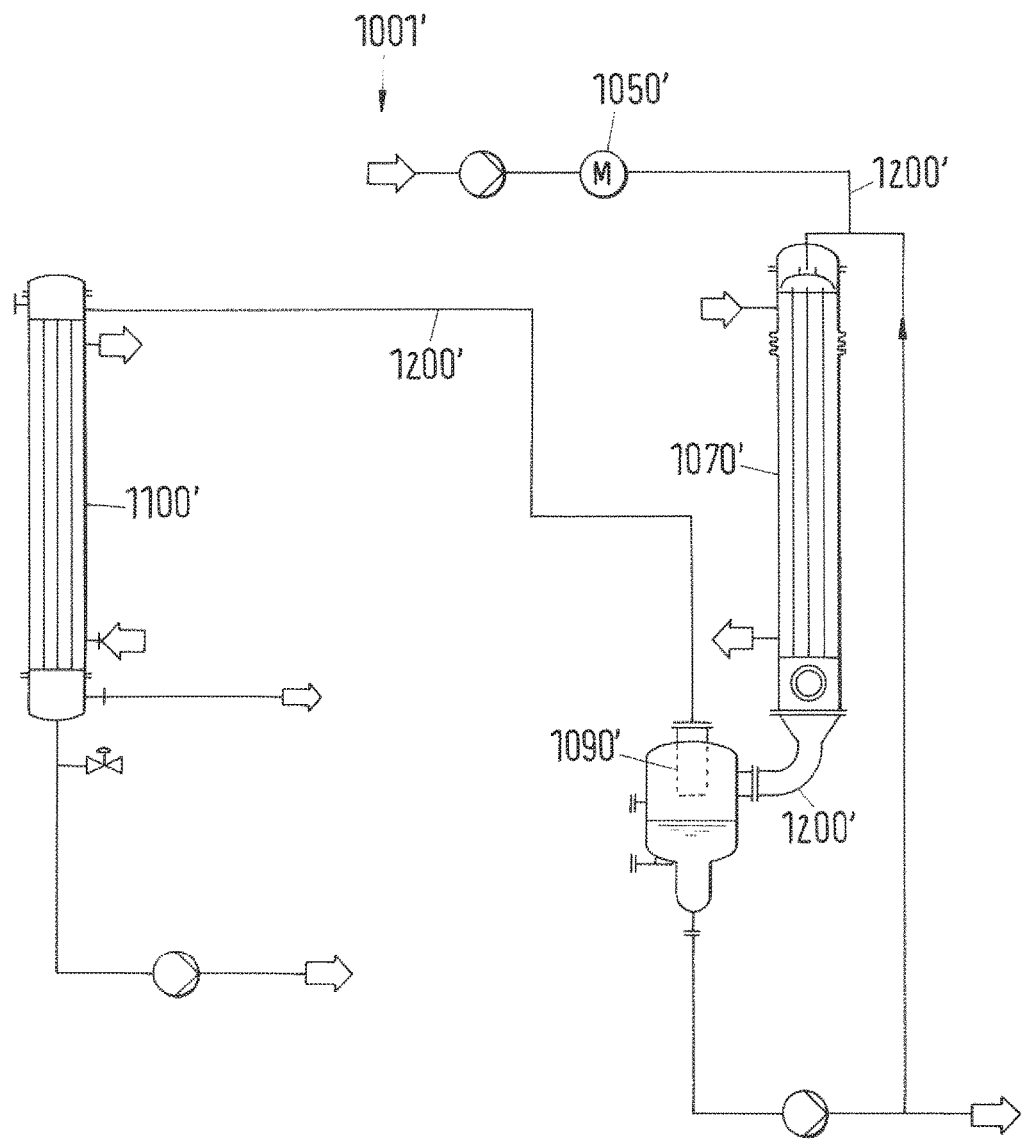
FIG. 1 shows a schematic view of an evaporator system according to the prior art.

FIG. 1 shows a schematic view of an evaporator system according to the prior art, which as a whole is labeled with reference number 1001'. This system 1001' consists of four separate sub-units, each contained in their own pressure vessels with their own individual shells and connected together by piping 1200'. The four sub-units are a feed pre-heater 1050', an evaporator sub-unit 1070', a separator 1090', and a condenser 1100'. Such conventional systems suffer from large pressure drops and are costly and complex to design and operate, as well as have a large "footprint".

Figure 2:
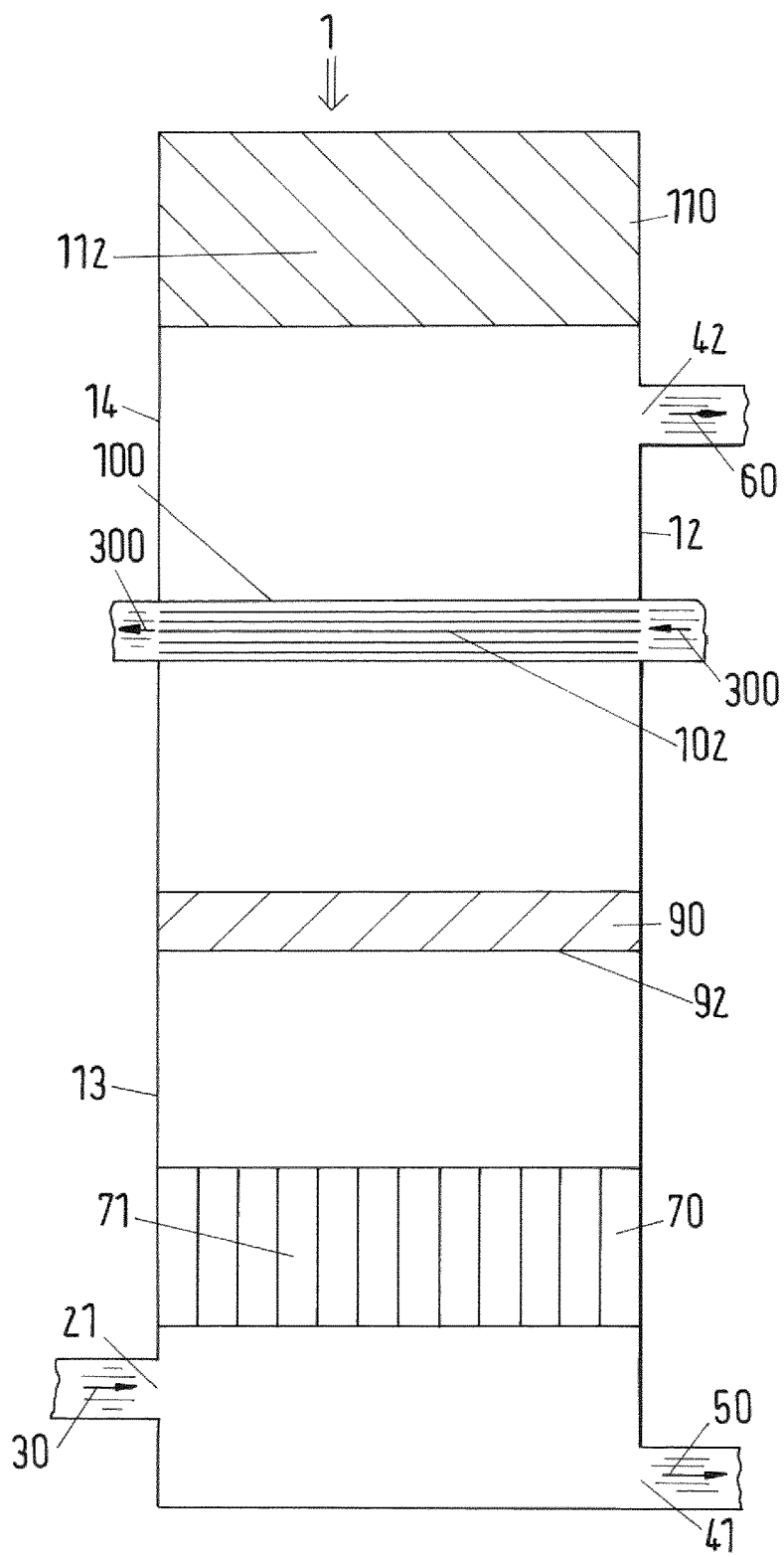
FIG. 2 shows a schematic view of an embodiment of an evaporator according to the invention in which the internal sub-unit and its surface are located above the evaporator sub-unit but below the heat exchanger sub-unit.

FIG. 2 shows a schematic view of an embodiment of an evaporator according to the invention, which as a whole is labeled with reference number 1. The evaporator 1 is not specifically limited as to form, shape, construction or composition unless specifically indicated otherwise. Any suitable material that can be fabricated can be made into an evaporator 1. For reasons of economy, evaporators are often made from stainless steel or another material indicated for the specific application. Evaporator internal components are generally made from metals depending upon the process requirements. In one embodiment the evaporator 1 and its components are constructed of metals. Suitable metals include carbon steel, stainless steel, nickel alloys, copper alloys, titanium and zirconium.

The embodiment in FIG. 2 shows a substantially vertical evaporator 1, but it will be understood by one skilled in the art that other orientations of the evaporator 1 are possible, so long as technically feasible.

Evaporators and their construction and operation are well known in the art, for example, as disclosed in Handbook of Evaporation Technology, by P. E. Minton, published in 1986 by Noyes (ISBN 0-8115-1097-7), Fundamentals and modeling of separation processes: absorption, distillation, evaporation and extraction, by C. D. Holland, published in 1975 by Prentice-Hall (ISBN 0-13-344390-6), and Selecting Evaporators For Process Applications, by W. B. Glover, Chemical Engineering Progress, December 2004, p. 26-33, www.cepmagazine.org. Unless indicated otherwise, conventional construction materials and means, as well as components and auxiliaries, may be used for the evaporator 1, and the column 1 may be operated in an evaporation process in a conventional manner as known in the art. For example, these cited reference handbooks and textbooks disclose a variety of conventional means for evaporating, heat exchanging and condensing for use in evaporators.

The evaporator 1 is adapted for a counter-current flow of at least one liquid and one vapor therein and comprises within one common vessel 12, all in fluid and/or vapor communication with one another: a first inlet 21 for a first liquid feed stream 30, a first outlet 41 for a first liquid output stream 50, a second outlet 42 for a first vapor stream 60, an evaporator sub-unit 70 comprising an evaporating means 71 for evaporation of a liquid to produce a vapor, an internal sub-unit 90 having a surface 92 embodied such that a contact is provided between a vapor and a liquid and a mass transfer is provided between the vapor and the liquid, a heat exchanger sub-unit 100 comprising a heat exchanging means 102 embodied such that a heat exchange is provided between a liquid stream 300, preferably the feed stream 30 or a cooling or heating stream (not shown in the Figures), and a liquid or vapor contained within the evaporator 1, and a condenser sub-unit 110 comprising a condensing means 112 for condensing the vapor to a condensate, wherein the internal sub-unit 90 is located substantially above the evaporator sub-unit 70, the heat exchanger sub-unit 100 is located substantially above the evaporator sub-unit 70, preferably substantially above the internal sub-unit 90, and the condenser sub-unit 110 is located substantially above the heat exchanger sub-unit 100 and the internal sub-unit 90. Note: the internal sub-unit 90 and its surface 92 are located above the evaporator sub-unit 100 but below the heat exchanger sub-unit 100 in the specific embodiment shown in FIG. 2.

The liquid streams 30 and 50 and vapor stream 60 are not specifically limited and each may comprise one or more organic compounds, solvents, water or mixtures thereof.

The evaporator sub-unit 70 comprises an evaporating means 71 for evaporation of a liquid to produce a vapor, which is conventional as known in the art and not specifically limited. The evaporating means 71 evaporates a liquid to a vapor as it passes in countercurrent flow through sub-unit 70. Suitable evaporating means 71 may comprise one or more heated surfaces 80, wherein the surfaces 80 are preferably those of tubes, channels, or plates.

The internal sub-unit 90 has a surface 92 embodied such that a contact is provided between a vapor and a liquid and a mass transfer is provided between the vapor and the liquid. The sub-unit 90 is conventional as known in the art and not specifically limited, and, for example, it may be an impingement separator of the wire mesh, vane, swirl or demister type. In a preferred embodiment, internal sub-unit 90 is a mist eliminator sub-unit 94 for eliminating a mist.

The heat exchanger sub-unit 100 comprises a heat exchanging means 102 embodied such that a heat exchange is provided between a liquid stream 300, preferably the feed stream 30 or a cooling or heating stream (not shown), and a liquid or vapor contained within the evaporator 1. The liquid stream 300 may be used after the heat exchange in the evaporator 1, e.g. as the feed stream 30, or it may be used as a feed stream for another system. The heat exchanger sub-unit 100 and means 102 are conventional as known in the art and not specifically limited. For example, the sub-unit 100 may be of the tubular, plate, extended surface, regenerative, shell and tube types, and the flow arrangement may be single pass, such as counter, parallel, cross, split or divided flow types. In a preferred embodiment (not shown in FIG. 2, but shown in FIG. 4), the heat exchanger sub-unit 100 is a feed preheater sub-unit 105 for preheating the feed stream 30.

The condenser sub-unit 110 comprises a condensing means 112 for condensing the vapor to a condensate. The condenser sub-unit 110 and means 112 are conventional as known in the art and not specifically limited, and, for example, the sub-unit 110 may be a surface condenser such as a shell and tube heat exchanger, or a Liebig, West, Allihn, Davies, Graham, coil, Dimroth, spiral, or Friedrichs condenser. The coolant may be air, water, or other gaseous, liquid or solid coolant.

The common vessel 12 is not specifically limited as to form, shape or composition. In the embodiment shown in FIG. 2 it is cylindrical in shape. The first inlet 21, first outlet 41, and second outlet 42 are all conventional, as known in the art. The first inlet 21 is located in a lower portion of the vessel 13, preferably substantially above the evaporator sub-unit 70, the first outlet 41 is located substantially below the evaporator sub-unit 70, and the second outlet 42 is located substantially above the evaporator sub-unit 70 and the first inlet 21. The locations of the inlet 21 and outlets 41 and 42 within the evaporator 1 are not specifically further limited. In the embodiment shown in FIG. 2 the inlet 21 is located substantially below the evaporator sub-unit 70. One skilled in the art will understand that the reverse geometry thereof is within the scope of the invention.

Figure 3:
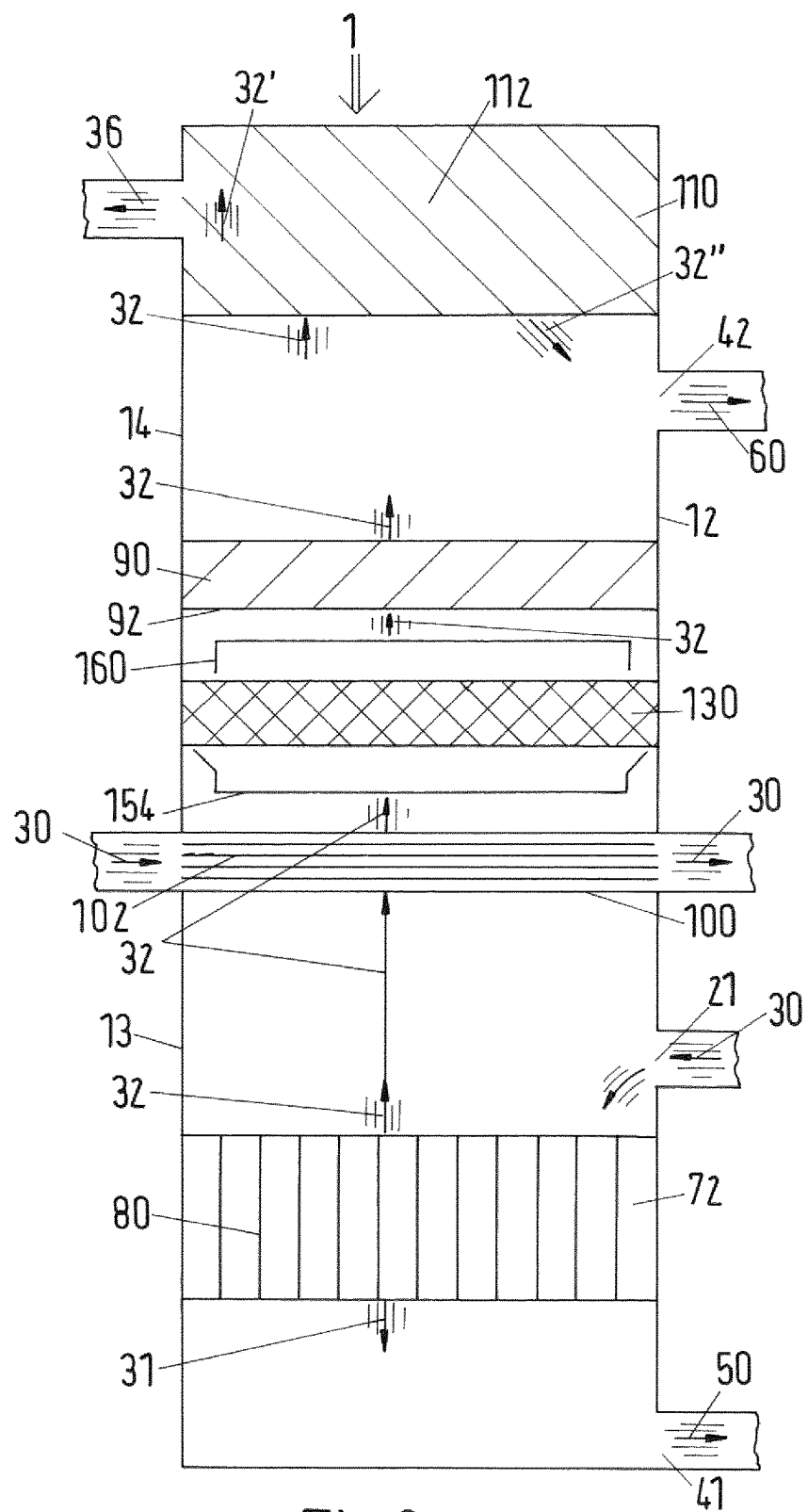
FIG. 3 shows a schematic view of a preferred embodiment of an evaporator according to the invention, in which the internal sub-unit and its surface are located above both the evaporator sub-unit and the heat exchanger sub-unit and in which within the common vessel of the evaporator is a falling film evaporator sub-unit comprising one or more heated surfaces, a static section, a collector and a distributor.

In the embodiment shown in FIG. 3, the internal sub-unit 90 and its surface 92 are located above both the evaporator sub-unit 70 and the heat exchanger sub-unit 100 and in which within the common vessel 12 of the evaporator 1 is a falling film evaporator sub-unit 72 comprising one or more heated surfaces 80, a static section 130, a second collector 154 and a distributor 160.

As shown in FIG. 3, in several preferred embodiments the one or more heated surfaces 80 are substantially vertical in order to make use of gravity as a force. In some embodiments the surfaces 80 are preferably those of tubes, channels, or plates in order to have a large surface area and favorable flow properties.

One skilled in the art will understand that other arrangements of the static section 130 and the collector 154 and distributor 160 are possible. In some preferred embodiments the one or more sections 130 are located substantially above the evaporator sub-unit 70 and substantially below the condenser sub-unit 110. For example, in one embodiment the static section 130, collector 154, and distributor 160 are all above internal sub-unit 90, and in another embodiment the collector 154 and distributor 160 collect liquid from and distribute liquid to the evaporator sub-unit 70, respectively.

Each static section 130 comprises a packing and/or trays. In one preferred embodiment structured packing is used due to its superior performance. In certain embodiments the packing comprises mass transfer elements known in the art as random packings, such as Raschig and/or Pall rings, saddles, such as e.g. Berl saddles, spheres, hooks, or by the tradenames NOR-PAC™, BIO-NET™, or Hel-X™. In certain other embodiments, the packing comprises structured packings such as those known by the trademarks Mellapak™ Montz-Pak™, Ralu-Pak™, SMV™, or Raschig Super-Pak™. In another preferred embodiment, a combination of trays and structured packing is made, preferably one in which a dual flow tray is located in between each packing element.

The collector 154 and distributor 160 are conventional and well-known in the art for the collection or distribution of liquids in separation devices such as columns or evaporators. Collector types include chimney tray, Chevron-type, trough liquid, and deck liquid collectors. Collectors are typically used for total draw-off of a liquid to product or pump-around pump down loops, partial draw-off of a liquid with overflow continuing down the evaporator 1, or the collection of liquid for mixing. Typically Chevron-type and trough liquid collector plates require less height than deck-style collectors, and thus they are preferred where height is limited.

One skilled in the art will understand that that the performance of an evaporator sub-unit 70 and/or static section 130 can be significantly affected by how uniformly the feed and solvent inlet streams are distributed to their cross section. The requirements for distribution and redistribution vary depending upon the type of internals (packing, trays, agitators, or baffles) and the impact of the internals on the flow of dispersed and continuous phases within the evaporator 1. Important aspects of the distributor 160 include the number of holes and the hole pattern (geometric layout), hole size, number of downcomers or upcomers (if used) and their placement, the maximum to minimum flow rates the design can handle (turndown ratio), and resistance to fouling. Liquid distributors are typically used to achieve uniform liquid distribution across the evaporator cross section, and distributors 160 will often be located above the evaporator sub-unit 70 and/or the static section 130. Useful distributor 160 types include splash plate, channel types with bottom holes or lateral tubes, pipe orifice, chimney tray, ladder type, pan, deck, trough, pipe arm, trickling or spraying device, spray condenser, sprinkler, spray, and weir overflow distributors.

Figure 4:
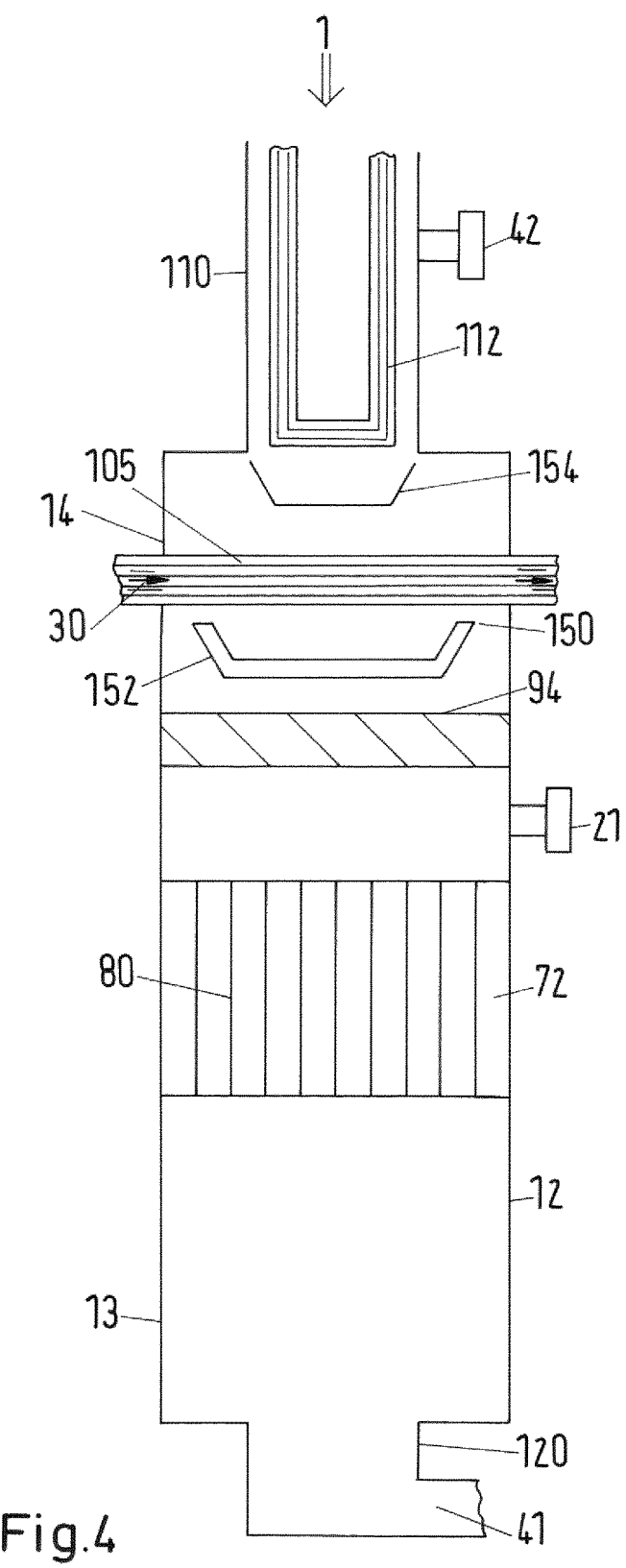
FIG. 4 shows a schematic view of another preferred embodiment of an evaporator according to the invention, in which a mist eliminator sub-unit for eliminating a mist is located above both the evaporator sub-unit and the feed preheater sub-unit, and in which within the common vessel of the evaporator is a falling film evaporator sub-unit comprising one or more heated surfaces, a first collector having a jacket, a second collector, and a boot.

FIG. 4 shows a schematic view of yet another preferred embodiment of an evaporator 1 according to the invention, in which within the common vessel 12 a mist eliminator sub-unit 94 for eliminating a mist is located above both the evaporator sub-unit (Note: In this figure it is more specifically a falling film sub-unit 72) and below the feed preheater sub-unit 105, and in which within the common vessel 12 of the evaporator is a falling film evaporator sub-unit 72 comprising one or more heated surfaces 80, a first collector 150 having a jacket 152 for providing thermal isolation, and a second collector 154. The double-wall jacketing acts as a thermal insulation and reduces the re-evaporation of collected condensate and condensation on the bottom side of the first collector 150. The collected condensate may be fully or partially withdrawn or used in refluxing in the case of a reflux condenser.

As exemplified by this specific embodiment in FIG. 4, the evaporator 1 may also additionally comprise a boot 120 contained within the lower portion 13 of the common vessel 12 and located substantially below the evaporator sub-unit 70, which is a falling film evaporator sub-unit 72 in this specific embodiment. The boot 120 is not specifically limited as to form, shape, construction or composition unless specifically indicated otherwise. In order to minimize liquid hold-up, the boot 120 will generally have a diameter that is smaller than the diameter of the lower portion 13 of the common vessel 12. In order to minimize the use of piping and thus residence time and degradation, it will be preferred that the boot 120 is contained within the common vessel 12. For the case of liquids having suspended solids, it will be preferred to locate the first outlet 41 on the side rather than the bottom of the boot 120 so as to allow the solids to settle to the bottom of the boot 120 and be removed.

Figure 5:
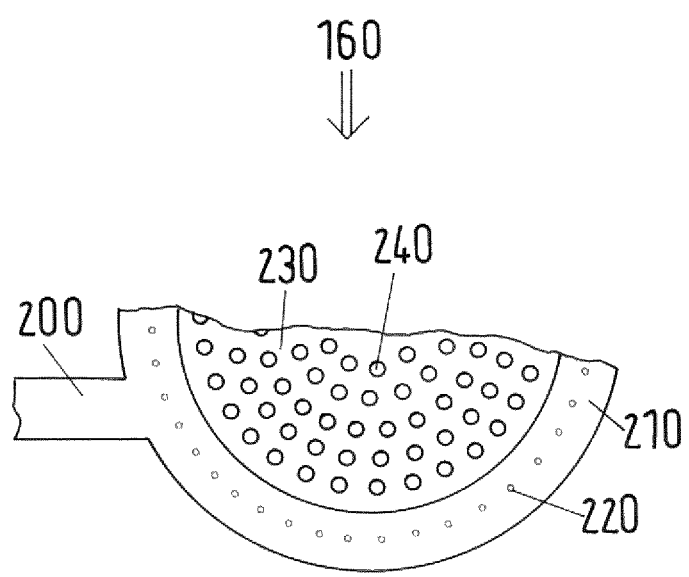
FIG. 5 shows a schematic view of a preferred embodiment of a liquid distributor for use with the evaporator according to the invention.

FIG. 5 shows a preferred embodiment of the liquid distributor 160 for distribution to a falling film evaporator. In this embodiment, the liquid flows first thru a channel 200 and at the end of the channel into a ring channel 210 and from there flows thru openings 220 onto the tube plate 230 comprising vertical tubes 240. Such a preferred design of the distributor 160 allows an optimal distribution of liquid to the falling film evaporator while still remaining relatively "open" to allow the rising vapor to pass in counter-current flow to the descending liquid.

In order to minimize pressure losses in the evaporator 1 in many preferred embodiments, a means other than piping 1200' is used for leading the liquid and the vapor between any of the sub-units 70, 90, 100, and 110. As can be seen from the embodiments in FIG. 1-4, the use of piping 1200' may be avoided by locating the sub-units near each other within one common vessel 12 such that the sub-units are all in fluid and/or vapor communication with one another.

In order to minimize investment and maintenance costs, moving parts are absent within the common vessel 12 in several preferred embodiments of the evaporator 1.

Although not shown in the schematic figures for simplicity, one skilled in the art will understand that other conventional evaporator and separation device internals may be used without limitation in the invention, such as feed devices like feed pipes and/or sumps, bed limiters, support plates and grids, dispersers, disperser/support plates, continuous phase distributors, packing support and hold-down plates, entrainment separators, and retainers/redistributors. Suitable internals are disclosed for example in the technical brochure "Internals for Packed Columns" from Sulzer Chemtech as publication 22.51.06.40-XII.09-50.

Auxiliaries for the evaporator 1 are conventional and well-known in the art and include electrical supplies, coolant and heating fluid supplies and distributions, level controllers, pumps, valves, pipes and lines, reservoirs, drums, tanks, and sensors for measuring such parameters as flow, temperatures and levels. The evaporator 1 and the separation process will be conveniently controlled by means of a computer interface equipped with appropriate sensors.

Another aspect of the invention is a process to separate at least two components, wherein to an evaporator 1 of the invention, a first liquid feed stream 30 comprising the at least two components is fed by means of the first inlet 21, the feed stream 30 passes into the evaporator sub-unit 70, in which a vapor stream 32 is formed from the feed stream 30 by means of heat and mass transfer, preferably in contact with the heated surfaces 80, wherein the vapor stream 32 exits in a substantially upward direction from the sub-unit 70, and wherein the remaining non-vaporized feed stream 31 exits in a substantially downward direction from the sub-unit 70 and is subsequently removed as a first liquid output stream 50 comprising a first component of the at least two components by means of the first outlet 41. The vapor stream 32, optionally containing a mist, passes into the internal subunit 90, in which the mist, if present, is removed from the vapor stream 32, and the mist is, optionally collected, withdrawn from the evaporator 1 and/or returned by means of gravity to the evaporator sub-unit 70, the vapor stream 32 passes into the heat exchanger sub-unit 100, in which a heat transfer occurs between the vapor stream 32 and a liquid stream 300, preferably the feed stream 30 or a cooling or heating stream (not shown in Figures), wherein, if the liquid stream is the feed stream 30 the heat transfer occurs prior to the feed stream 30 passing into the vessel 12 through the first inlet 21, and wherein a first portion of the vapor stream 32' is condensed within the condenser sub-unit 110 to form a first condensed stream 36 which is partially or fully withdrawn from the evaporator 1 and/or returned by means of gravity to the evaporator sub-unit 70 and a second non-condensed portion of the vapor stream 32" is removed as a first vapor stream 60 comprising a second component of the at least two components by means of the second outlet 42. An example specific embodiment of such a separation process of the invention is illustrated schematically in FIG. 3 for the case of that specific embodiment of the evaporator 1.

Evaporation processes are well known in the art, for example, as disclosed in the earlier cited text- and reference books. Unless indicated otherwise, conventional evaporation processes and their various liquid feed streams 30 and operating parameters and conditions may be used in the evaporation processes according to the invention and making use of the evaporator 1.

This separation process of the invention has the benefit of making possible a reduction in the operating temperature of the process. This is both more economical and makes the process milder, thereby minimizing problems of thermal degradation and decomposition of thermally-sensitive fine compounds. In preferred embodiments, the feed stream 30 and the first liquid output stream 50 comprise a compound having a thermal degradation temperature of from 10 to 300, preferably from 20 to 275, most preferably 30 to 250° C., and preferably one having a viscosity at the operating temperature of less than or equal to 20, preferably 10, most preferably 2 millipascal-second. In the present application, the "operating temperature" concerning the viscosity value refers to the measured temperature of the liquid in the lower portion 13 within the common vessel 12. As an example, several heavy fatty acid monoesters have viscosities of between about 8 to about 1 millipascal-second as their temperatures vary from about 40 to about 240° C. The evaporation process of the invention is particularly well suited for the removal of solvents from such thermally-sensitive compounds. In some preferred embodiments, the feed stream 30 and the first vapor stream 60 comprise a solvent.

In many preferred embodiments of the process, a relatively low operating temperature is achieved by means of a suitably low pressure within the evaporator sub-unit 70, in some preferred embodiments the pressure is less than 10, preferably 5, more preferably 2, most preferably 1 mbar.

Yet another aspect of the present invention is the use of the evaporator 1 or the separation process of the invention in the purification and/or concentration of a compound having a thermal degradation temperature of from 10 to 300, preferably from 20 to 275, most preferably 30 to 250° C., and preferably one having a viscosity at the operating temperature of less than or equal to 20, preferably 10, most preferably 2 millipascal-second, and/or in the removal of a solvent, or in the separation of a compound having a boiling point under atmospheric pressure at a temperature above its thermal decomposition temperature. As discussed earlier, the evaporator 1 and process of the invention bring significant benefits when separating such compounds.

EXAMPLES

The following examples are set forth to provide those of ordinary skill in the art with a detailed description of how the evaporator 1 adapted for a counter-current flow of at least one liquid and one vapor therein, processes, and uses claimed herein are evaluated, and they are not intended to limit the scope of what the inventors regard as their invention.

In these examples, the evaporator and process of the invention were successfully used in a typical application for the purification of a heavy fatty acid monoester composed of a C8 alcohol and a C18 fatty acid. The fatty acid monoester had a normal boiling point of about 465° C., about 250° C. at 10 mmHg, and about 215° C. at 1 mm Hg. The fatty acid monoester had a thermal decomposition temperature of about 250° C. The viscosity of the monoester was about 1 millipascal-second at about 220° C.

In particular, the purification was carried out using an evaporator 1 as shown in FIG. 4. The evaporation took place at a reduced pressure of less than 4 mbar (top pressure) measured at the second outlet 42 for the first vapor stream 60 as shown in FIG. 4. The pressure measured over the liquid level in the lower portion 13 of the common vessel 12 was about 1 mbar greater than the top pressure. A temperature of less than 240° C. was measured in the boiling liquid contained in the boot 120.

During stable operation the heavy fatty acid monoester could be produced with the desired quality. For example, the acid number was less than 0.25 mg KOH/g, and it remained constant relative to that of the feed to the evaporator. Furthermore the heavy fatty acid monoester obtained was colorless and had color indices Y (yellow) and R (red) of both less than 1, and had no detectable turbidity. In contrast, the residue obtained from the bottom of the evaporator was dark brown in appearance. The feed to the evaporator contained di- and triglyceride components; however, these components were undetectable in the distilled monoester product. The residual concentration of monoester in the first liquid output stream 50 (bottom residue) removed via the first outlet 41 was less than 80% (corresponding to less than 1% of the feed in this example).

In a second comparative trial, a purification of the same feed stream containing the same heavy fatty acid monoester was carried out on an evaporator system according to the prior art, similar to the one shown in FIG. 1, and with a comparable specific evaporation rate as in the previous example. However, the desired product quality could not be achieved in this system of the prior art because of the significant pressure drop over the entire unit. Although the pressure after the condenser could be reduced to about 2 mbar, the temperature of the boiling liquid was however greater than 250° C. This temperature correlates for this same ester composition with a pressure drop of more than 4 mbar. The minimum operating temperature achievable in this prior art system was therefore about 10° C. higher than that obtainable with the evaporator and process of the invention. This higher operating temperature resulted in significant thermal degradation and discoloration of the monoester product obtained.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. An evaporator adapted for a counter-current flow of at least one liquid and one vapor therein, comprising:
   a first inlet for a first liquid feed stream,
   a first outlet for a first liquid output stream,
   a second outlet for a first vapor stream,
   an evaporator sub-unit comprising an evaporating means for evaporation of a liquid to produce a vapor,
   an internal sub-unit having a surface embodied such that a contact is provided between a vapor and a liquid and a mass transfer is provided between the vapor and the liquid,
   a heat exchanger sub-unit comprising a heat exchanging means embodied such that a heat exchange is provided between a liquid stream and a liquid or vapor contained within the evaporator,
   and a condenser sub-unit comprising a condensing means for condensing the vapor to a condensate,
   wherein the first inlet, the first outlet, the second outlet, the evaporator sub-unit, the internal sub-unit, the heat exchanger sub-unit, and the condenser sub-unit are all in fluid and/or vapor communication with one another and are contained within one common vessel,
   wherein the internal sub-unit is located above the evaporator sub-unit, the heat exchanger sub-unit is located above the evaporator sub-unit, and the condenser sub-unit is located above the heat exchanger sub-unit and the internal sub-unit,
   wherein the first inlet is located in a lower portion of the vessel, the first outlet is located below the evaporator sub-unit, and the second outlet is located above the evaporator sub-unit and the first inlet,
   and wherein the evaporator additionally comprises a first collector located in an upper portion of the vessel and below the heat exchanger sub-unit, and above the evaporator sub-unit, and embodied such that a condensate is collected and the collected condensate is partially or fully withdrawn from or refluxed within the common vessel.

2. The evaporator of claim 1, wherein the liquid stream is one of the feed stream, a cooling stream and a heating stream.

3. The evaporator of claim 1, wherein the heat exchanger sub-unit is located above the internal sub-unit.

4. The evaporator of claim 1, wherein the first inlet is located above the evaporator sub-unit.

5. The evaporator of claim 1, wherein the first collector has a jacket for providing thermal isolation.

6. The evaporator of claim 1, wherein the evaporator sub-unit is a falling film evaporator sub-unit comprising one or more heated surfaces.

7. The evaporator of claim 6, wherein the one or more heated surfaces are vertical.

8. The evaporator of claim 1, wherein the heat exchanger sub-unit is a feed preheater sub-unit for preheating the feed stream and the internal sub-unit is a mist eliminator sub-unit for eliminating a mist.

9. The evaporator of claim 1, wherein the evaporator additionally comprises a boot, wherein the boot is contained within the common vessel and is located in the lower portion and below the evaporator sub-unit.

10. The evaporator of claim 1, wherein a means other than piping is used for leading the liquid and/or the vapor between any of the sub-units.

11. The evaporator of claim 1, wherein moving parts are absent within the common vessel.

12. The evaporator of claim 1, wherein the evaporator additionally comprises one or more static sections, wherein the one or more static sections are located above the evaporator sub-unit and below the condenser sub-unit, and wherein the static sections each comprise a packing and/or trays.

13. The evaporator of claim 1, wherein the evaporator additionally comprises a second collector for collecting a liquid and/or a distributor for distributing a liquid.

14. A process to separate at least two components,
wherein to the evaporator of claim 1, a first liquid feed stream comprising the at least two components is fed by means of the first inlet,
the feed stream passes into the evaporator sub-unit, in which a vapor stream is formed from the feed stream by means of heat and mass transfer in an evaporating means,
wherein the vapor stream exits in a upward direction from the sub-unit, and wherein the remaining non-vaporized feed stream exits in a downward direction from the sub-unit and is subsequently removed as a first liquid output stream comprising a first component of the at least two components by means of the first outlet,
the vapor stream passes into the internal subunit,
the vapor stream passes into the heat exchanger sub-unit, in which a heat transfer occurs in a heat exchanging means between the vapor stream and a liquid stream,
wherein, if the liquid stream is the feed stream the heat transfer occurs prior to the feed stream passing into the vessel through the first inlet,
wherein a first portion of the vapor stream is condensed within the condenser sub-unit in a condensing means to form a first condensed stream which is partially or fully withdrawn from the evaporator and/or returned by means of gravity to the evaporator sub-unit and a second non-condensed portion of the vapor stream is removed as a first vapor stream comprising a second component of the at least two components by means of the second outlet.

15. The process of claim 14, wherein the vapor stream contains a mist and the mist is removed from the vapor stream in the internal subunit, and the mist is withdrawn from the evaporator and/or returned by means of gravity to the evaporator sub-unit.

16. The process of claim 14, wherein the feed stream and the first liquid output stream comprise a compound having a thermal degradation temperature of from 10 to 300° C.

17. The process of claim 16, wherein the compound comprised in the feed stream and the first liquid output stream has a viscosity at the operating temperature of less than or equal to 20 millipascal-second.

18. The process of claim 14, wherein the feed stream and the first vapor stream comprise a solvent.

19. The process of claim 14, wherein the pressure within the evaporator sub-unit is less than 10 mbar.

20. A method for using evaporator of claim 1, comprising the steps of providing the evaporator of claim 1 and using it in the purification and/or concentration of a compound having a thermal degradation temperature of from 10 to 300° C., and/or in the removal of a solvent, or in the separation of a compound having a boiling point under atmospheric pressure at a temperature above its thermal decomposition temperature.

* * * * *